(12) United States Patent
Cristini et al.

(10) Patent No.: US 10,961,661 B2
(45) Date of Patent: Mar. 30, 2021

(54) MONITORING SYSTEM FOR MONITORING THE CONDITIONS OF A BAND CIRCULATING IN A PAPERMAKING MACHINE

(71) Applicant: S.A. GIUSEPPE CRISTINI S.P.A., Milan (IT)

(72) Inventors: Giovanni Cristini, Bergamo (IT); Matteo Michelotti, Milan (IT)

(73) Assignee: S.A. GIUSEPPE CRISTINI S.P.A., Milan (IT)

( * ) Notice: Subject to any disclaimer, the term of this patent is extended or adjusted under 35 U.S.C. 154(b) by 0 days.

(21) Appl. No.: 16/473,379

(22) PCT Filed: Dec. 27, 2017

(86) PCT No.: PCT/IB2017/058412
§ 371 (c)(1),
(2) Date: Jun. 25, 2019

(87) PCT Pub. No.: WO2018/122728
PCT Pub. Date: Jul. 5, 2018

(65) Prior Publication Data
US 2020/0141060 A1    May 7, 2020

(30) Foreign Application Priority Data
Dec. 27, 2016  (IT) .................. 102016000131322

(51) Int. Cl.
*D21H 23/78*    (2006.01)
*D21G 9/00*    (2006.01)
(Continued)

(52) U.S. Cl.
CPC ......... *D21G 9/0036* (2013.01); *D21G 9/0027* (2013.01); *D21F 7/06* (2013.01);
(Continued)

(58) Field of Classification Search
USPC .................................................. 162/198, 263
See application file for complete search history.

(56) References Cited

U.S. PATENT DOCUMENTS 7,678,233 B2 * 3/2010 Beselt .................. D21G 9/0027
162/263
10,494,765 B2 * 12/2019 Michelotti ............. G01N 22/04
(Continued)

FOREIGN PATENT DOCUMENTS

WO    2016009354 A1    1/2016

OTHER PUBLICATIONS

International Search Report and Written Opinion in corresponding International Patent Application No. PCT/IB2017/058412 dated Mar. 14, 2018. 12 pages.
(Continued)

*Primary Examiner* — Mark Halpern
(74) *Attorney, Agent, or Firm* — Leason Ellis LLP

(57) ABSTRACT

A monitoring system for monitoring the conditions of a band circulating in a paper-making machine, comprises a guide extending substantially along an axis; and a monitoring apparatus movable along the guide and comprising at least one measuring device configured to measure at least one parameter indicative of the conditions of the band; the apparatus is a self-propelled motorized apparatus, provided with a motor and at least one driving member operated by the motor and which engages at least one corresponding surface of the guide to move the apparatus along the guide.

20 Claims, 4 Drawing Sheets

(51) Int. Cl.
*D21F 7/06* (2006.01)
*D21F 11/00* (2006.01)
*G01N 22/04* (2006.01)

(52) U.S. Cl.
CPC ............ *D21F 11/006* (2013.01); *D21H 23/78* (2013.01); *G01N 22/04* (2013.01)

(56) References Cited

U.S. PATENT DOCUMENTS

2014/0345397 A1* 11/2014 Beselt .................. D21G 9/0009
73/866.5
2016/0123773 A1 5/2016 Beselt

OTHER PUBLICATIONS

International Preliminary Report on Patentability in corresponding International Patent Application No. PCT/IB2017/058412 dated Nov. 23, 2018. 6 pages.

* cited by examiner

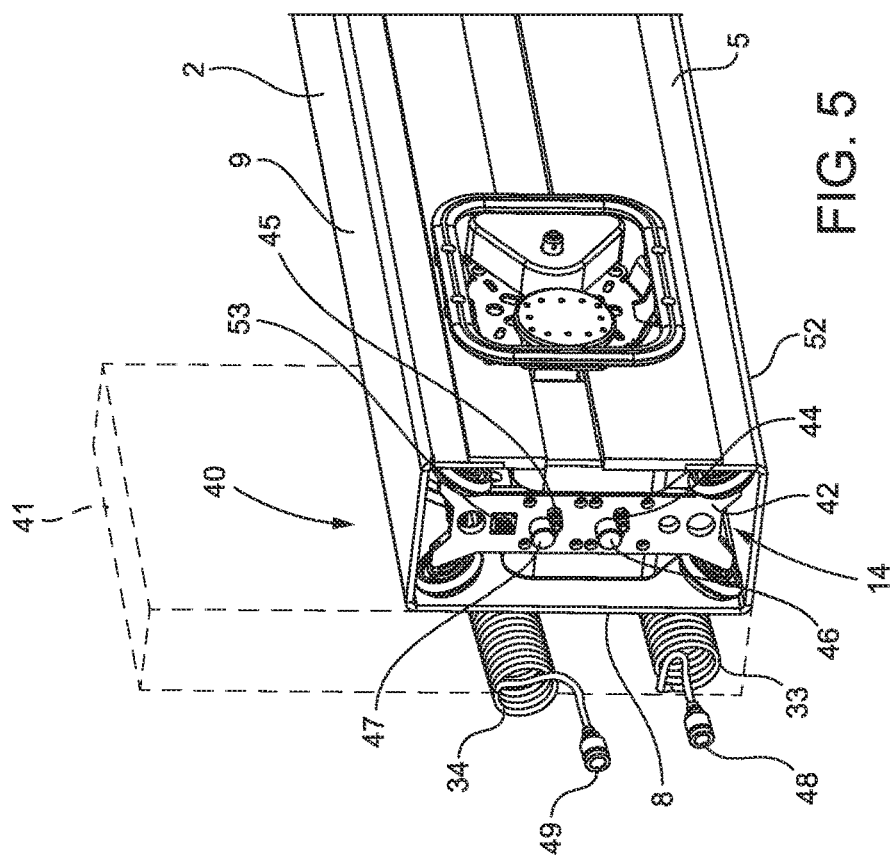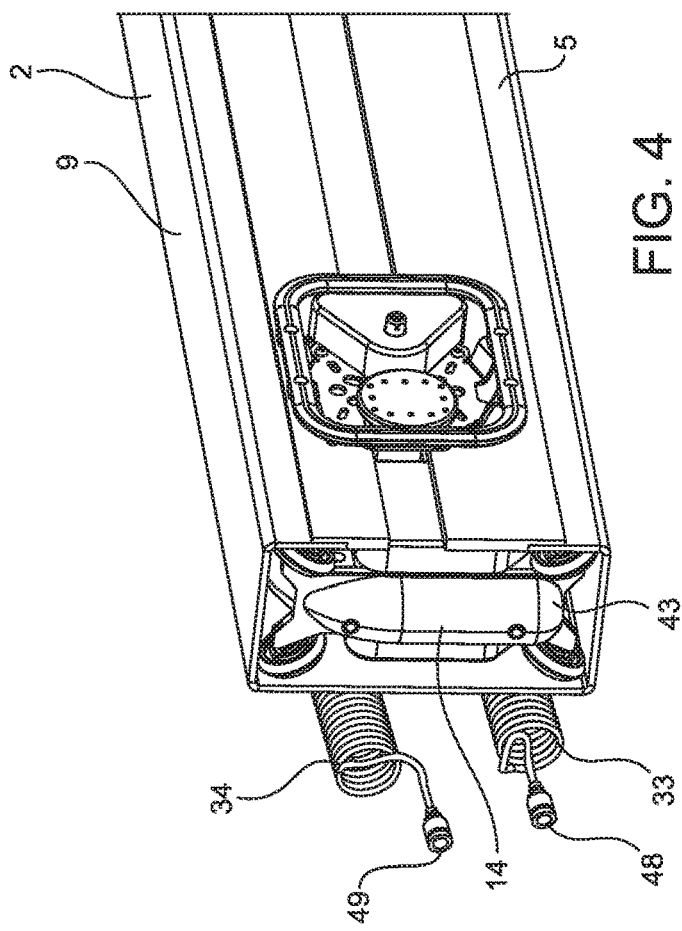

MONITORING SYSTEM FOR MONITORING THE CONDITIONS OF A BAND CIRCULATING IN A PAPERMAKING MACHINE

PRIORITY CLAIM CROSS-REFERENCE TO RELATED PATENT APPLICATIONS

This application is a U.S. National Phase Application under 35 U.S.C. § 371 of International Patent Application No. PCT/EP2017/084808, filed Dec. 29, 2017, which claims priority from Italian Patent Application No. 102016000131322 filed on Dec. 27, 2016, the disclosure of which is incorporated by reference.

TECHNICAL FIELD

The present invention relates to a monitoring system for monitoring the conditions of a band circulating in a papermaking machine.

BACKGROUND ART

As is known, in traditional paper-making machines the paper material in formation is transported on belts commonly known as bands, circulating on closed loop paths.

Each section of the machine generally has a specific kind of band.

To obtain good quality paper it is important to monitor not only the conditions of the paper material in formation but also the conditions of the bands in the various sections. The conditions of the band in fact, especially in relation to water absorption, water transport and water permeability, influence the quality of the sheet of paper in formation.

Various systems and appliances are known for monitoring the conditions of a band circulating in a papermaking machine and configured to measure various parameters indicative of the conditions of the band such as humidity, permeability, presence of contaminants, tension, etc.

Mobile appliances are in particular, known, moved manually by an operator and brought into the working position (near the band or in contact with it) as needed to make the necessary measurements; and fixed appliances, placed in predetermined positions along the path of the band.

It is particularly useful to measure the operating conditions of a band all along its width: it is therefore necessary to scan along directions transverse to the feed direction of the band.

The manual movement of a monitoring device does not allow such measurements to be performed in a repeatable manner and, above all, does not ensure the safety of the operators.

It is therefore known to install a monitoring device on a bridge transverse to the feed direction of the band; the apparatus is moved along the bridge by a drive system.

Systems of this type however leave room for improvement, particularly in terms of constructive and operating simplicity, reliability and efficiency.

DISCLOSURE OF INVENTION

One purpose of the present invention is to provide a monitoring system of the conditions of a band circulating in a papermaking machine which is free of the drawbacks mentioned of the prior art; in particular, one purpose of the invention to provide a monitoring system of the conditions of a band circulating in a papermaking machine which is simple and inexpensive to produce and fully effective and reliable in its operation, while ensuring total operator safety.

In accordance with these purposes the present invention relates to a monitoring system for monitoring the conditions of a band circulating in a papermaking machine as claimed in claim 1.

This way, the monitoring system of the invention is simple and inexpensive to produce and fully effective and reliable in its operation, while ensuring total safety of the operators.

BRIEF DESCRIPTION OF THE DRAWINGS

Further characteristics and advantages of the present invention will become clear from the following description of a non-limiting example of an embodiment made with reference to the appended drawings, wherein:

FIGS. 4 and 5 are perspective views of a detail of the monitoring system in FIG. 1 shown in respective operating configurations.

BEST MODE FOR CARRYING OUT THE INVENTION

Figure 1:
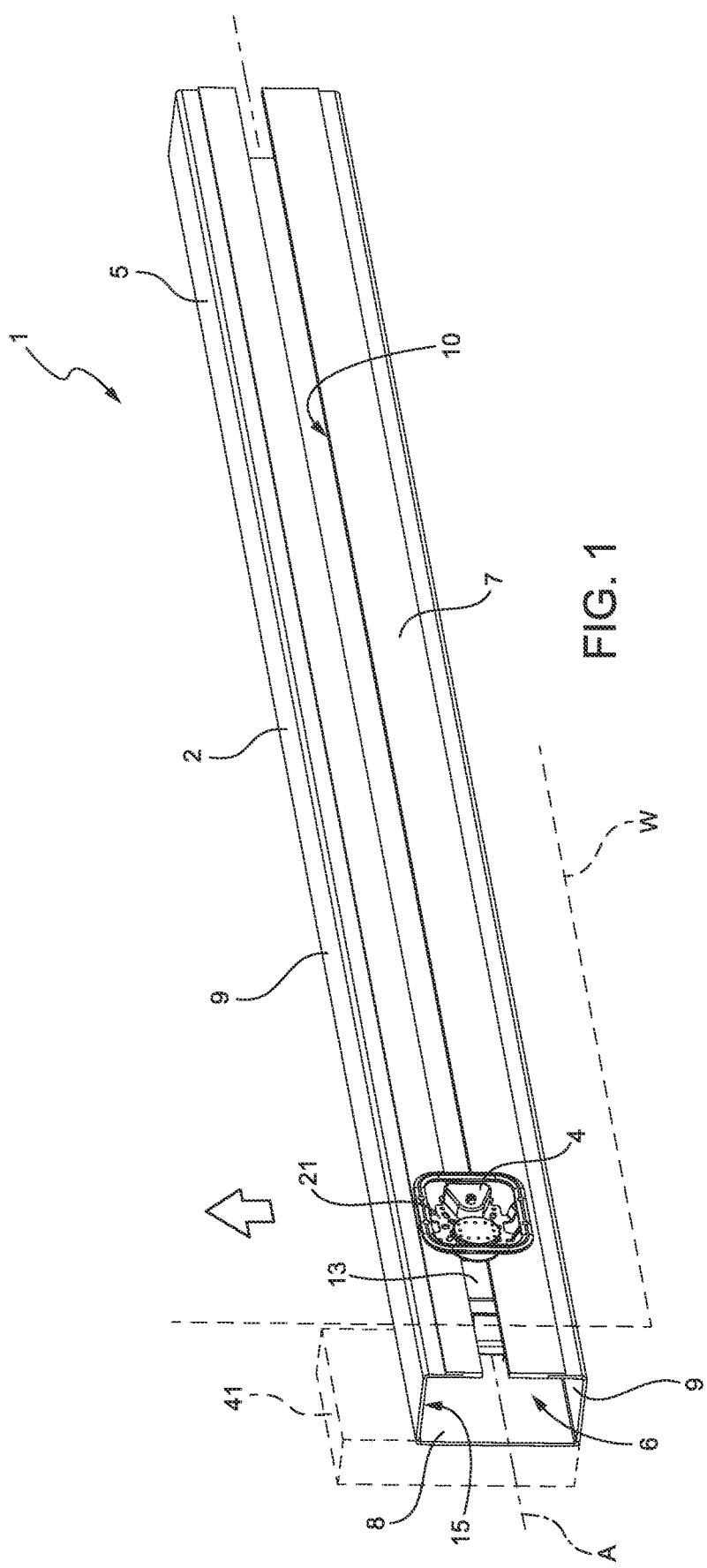
FIG. 1 is a perspective view of a monitoring system for monitoring the conditions of a band circulating in a papermaking machine according to the invention.

In FIG. 1 reference numeral 1 globally denotes a monitoring system for monitoring the conditions of a band W (only partially and schematically shown in FIG. 1) circulating in a papermaking machine (in itself known and not shown).

The monitoring system 1 comprises: a guide 2, configured to be installed as a bridge (i.e. defining a bridge structure) on a papermaking machine transverse to a feed direction of a band W circulating in the machine; and a moving monitoring apparatus 4 movable along the guide 2 and configured to measure at least a parameter indicative of the conditions of the band W.

The guide 2 comprises an internally hollow rod 5, for example substantially prismatic, extending along a straight axis A and having an inner longitudinal seat 6.

The guide 2 and the rod 5 are placed, in use, along a path of the band W in the papermaking machine, crosswise to a feed direction of the band W (shown by the arrow in FIG. 1) and preferably with the axis A substantially horizontal. In FIG. 1 the band W is illustrated schematically and only partially.

The seat 6 also extends along the axis A and is enclosed by walls 7, 8, 9 extending parallel to the axis A and placed around the axis A.

In the non-limiting example shown, but not necessarily, the seat 6 has a substantially square (in particular, rectangular) inner cross-section and is bounded by a front wall 7 and a rear wall 8, facing and substantially parallel to each other, and by a pair of lateral walls 9, facing and substantially parallel to each other and perpendicular to the front wall 7 and the rear wall 8. It is understood that the rod 5 and the seat 6 inside may have a different shape from that described and illustrated here merely by way of example.

The front wall 7 has a longitudinal through slot 10 parallel to the axis A.

The rod 5 may be fastened to uprights or other elements of a support frame (not shown) or of the paper-making machine, so that, in use, the rod 5 defines a bridge structure on the band W and is arranged substantially horizontal and substantially transverse to the band W, in particular transverse to the feed direction of the band W in the papermaking machine, and is facing the band W with the slot 10 facing the band W.

The apparatus 4 is at least partially housed in the seat 6 and moves in the seat 6 along the axis A, and thus along the guide 2, substantially straight and extending along the axis A.

Figure 2:
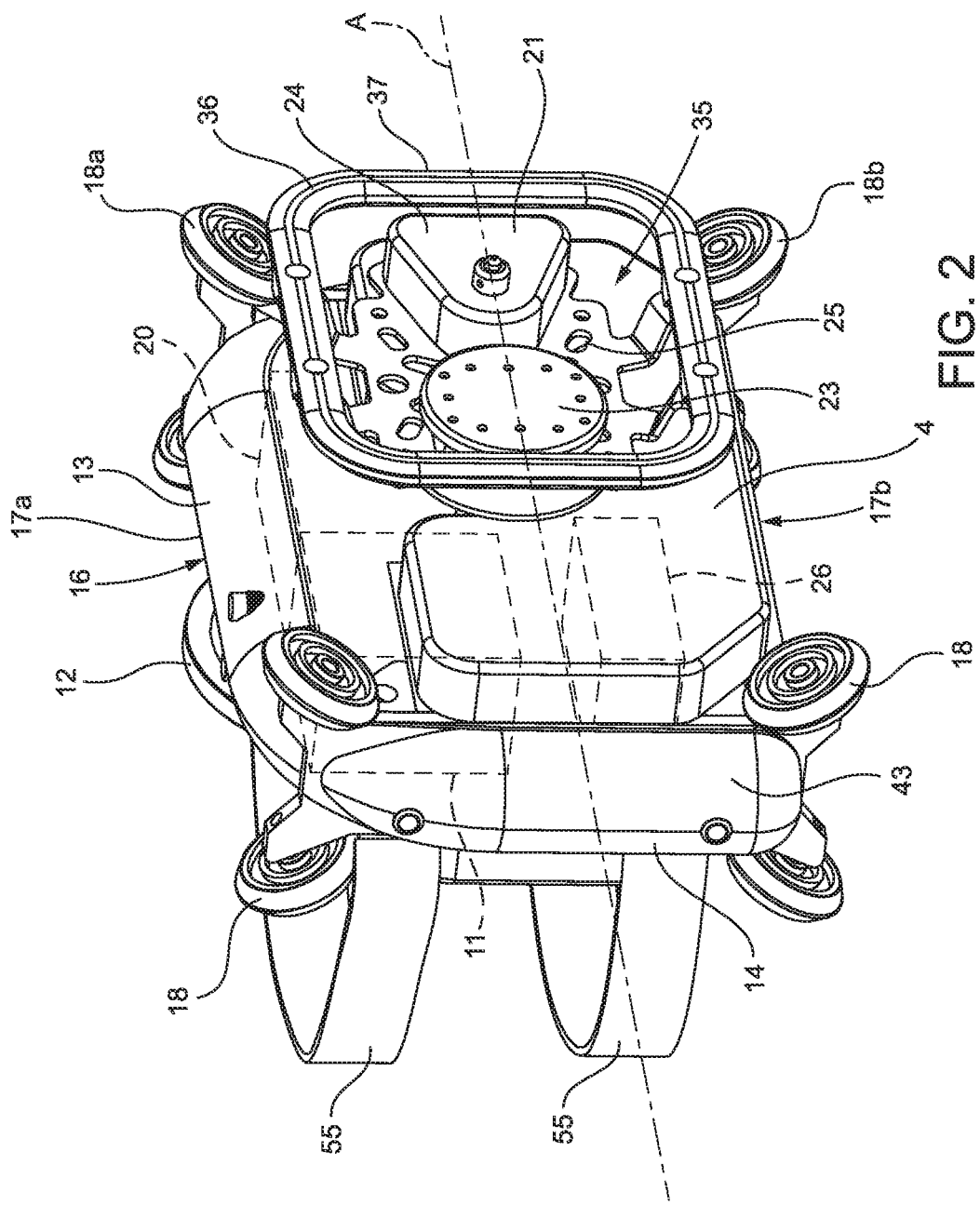
FIGS. 2 and 3 are perspective views from opposite longitudinal ends of a component of the monitoring system in FIG. 1.
Figure 3:
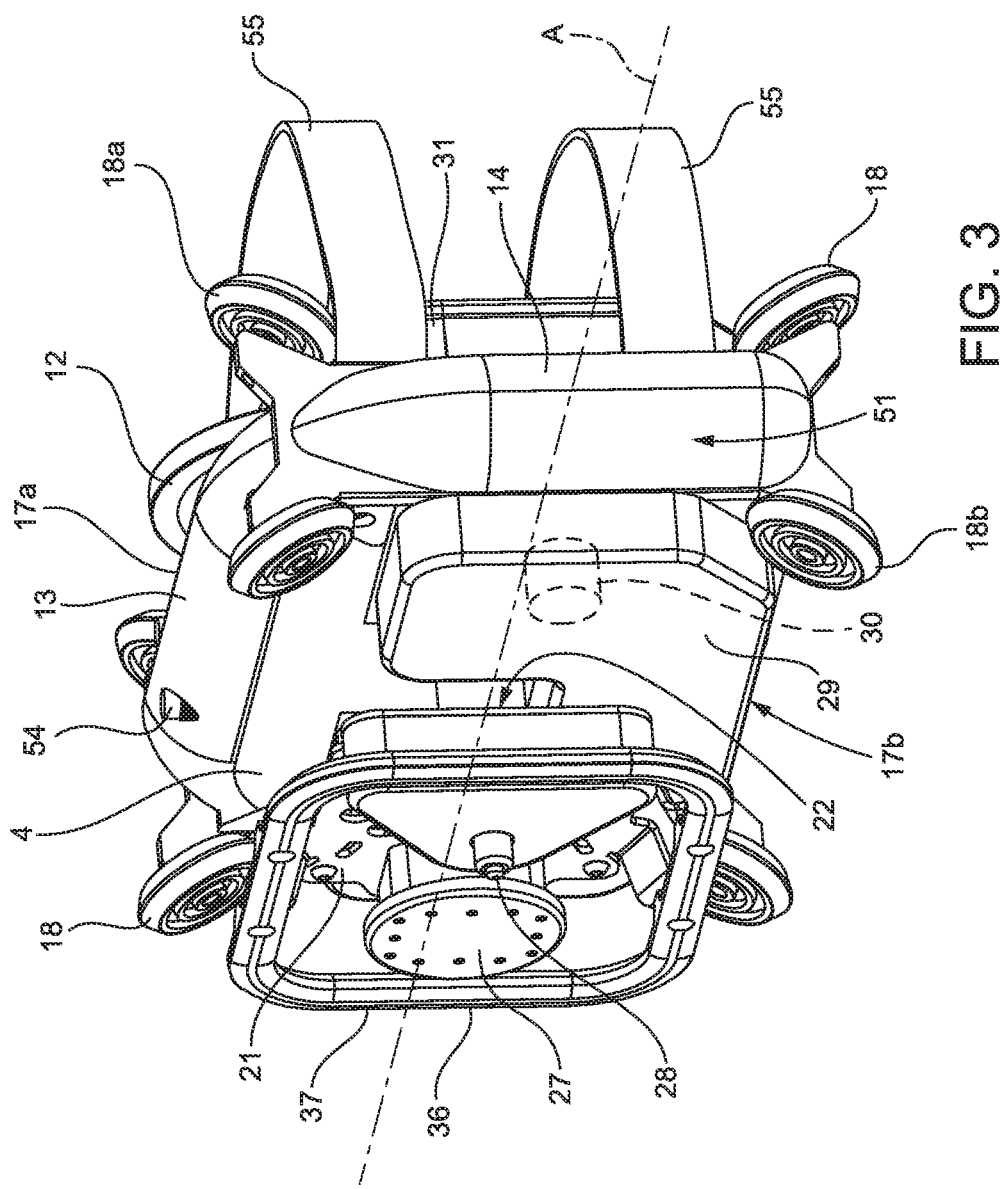

With reference also to FIGS. 2 and 3, the apparatus 4 is a motorized-moving apparatus, i.e. equipped with a motor 11 mounted on board the apparatus 4 and which actuates at least one driving member 12, for example one or more driving wheels.

In particular, the apparatus 4 comprises a casing 13 or chassis housed in the guide 2 and which extends substantially along the axis A (when it is housed in the guide 2) between two longitudinal opposite ends 14 of the apparatus 4 and from which the driving member 12 protrudes, which is for example a driving wheel connected to the motor 11 and which engages at least a corresponding surface 15 of the guide 2 to move the apparatus 4 along the guide 2.

In the non-limiting embodiment shown purely by way of example, the driving member 12 is located in an intermediate position between the ends 14 and projects from a rear face 16, facing the rear wall 8 of the guide 2, of the casing 13 and protrudes beyond an upper end 17a of the casing 13.

The driving member 12 contacts the surface 15 which is, in this case, an inner surface, facing the seat 6, of the side wall 9 of the guide 2. It is understood that the driving member 12 may be placed in different position on the casing 13 and contact another surface of the guide 2.

Advantageously, the driving member 12 has a tyred peripheral surface which touches the surface 15 of the guide 2 to improve the grip on the surface 15.

From the casing 13 then a plurality of idler wheels 18 (or rollers) project, cooperating with the guide 2 to guide the apparatus 4 along the guide 2.

In the non-limiting example illustrated, the apparatus 4 has two groups 18a, 18b of wheels 18: the two groups 18a, 18b are placed, with reference to the normal position of use of the apparatus 4 (apparatus 4 housed in the guide 2 and guide 2 arranged in a horizontal position), respectively at the upper end 17a and at a lower end 17b, opposite the upper end 17a of the casing 13; the two groups 18a, 18b of wheels 18 cooperate with respective inner surfaces 15, facing one another and facing towards the seat 6, of the side walls 9.

In particular, each group 18a, 18b comprises two pairs of wheels 18 arranged at respective longitudinal ends 14, opposite along the axis A, of the apparatus 4, i.e. of the casing 13. Each pair of wheels 18 consists of two wheels 18 protruding from opposite sides of the casing 13.

In the example shown, the apparatus 4 has four pairs of wheels 18 arranged in respective corners of the casing 13 and cooperating with respective inner surfaces 15 of the guide 2.

The wheels 18 are for example (but not necessarily) inclined with respect to the axis A. In other words, the wheels 18 swivel around respective rotation axes which are for example (but not necessarily) inclined with respect to the axis A.

In particular, the wheels 18 of each pair (i.e. the two wheels 18 placed at the same corner of the casing 13) are tilted relative to each other and converging towards the casing 13 and swivel around respective incident rotation axes, tilted relative to each other and to the axis A.

The wheels 18 are mounted idle on respective supports and freely swivel around respective rotation axes; the wheels 18 too, or some of them, may be equipped with rubberised surfaces for a better grip on the surfaces 15 of the guide 2.

It is understood that the driving member 12 may also be defined by one of the wheels 18, connected to the motor 11; and that the apparatus 4 may comprise, for example, several driving members 12, such as several driving wheels. It is also understood that the apparatus 4 can be fitted with one or more driving members 12 of another type, for example at least one gear which engages a rack placed along the guide 2.

The motor 11 (only schematically illustrated in FIG. 2) is housed in the casing 13; the motor 11 is in particular an electric motor with a gear reducer and possibly a transmission connected to the driving member 12.

Preferably, the motor 11 is powered by a battery 20 (shown only schematically in FIG. 2), also mounted on board the apparatus 4 and optionally replaceable, i.e. removable from the apparatus 4 to be replaced by another battery.

Alternatively, the motor 11 is powered via a power supply cable (not shown) suitably located along the rod 5 and equipped with a winding/unwinding system.

The apparatus 4 comprises at least one measuring head 21 projecting from the casing 13 and connected to the casing 13 by a connection portion 22, shaped and sized so as to be placed (as shown in FIG. 1) through the slot 10 so that the casing 13 and the measuring head 21 are arranged respectively inside the guide 2, i.e. in the seat 6, and outside the seat 6, beyond the front wall 7.

The apparatus 4 is configured to measure at least one parameter indicative of the conditions of the band W.

In particular, the apparatus 4 comprises at least one device 23, 24, 25 for measuring at least one parameter indicative of the conditions of the band W and in particular at least one of the following: a humidity measurement device 23, configured to measure the humidity of the band W; a permeability measurement device 24, configured to measure the permeability of the band W; a temperature measurement device 25, configured to measure the temperature of the band W.

The apparatus 4 further comprises a control unit 26, connected to the measurement devices 23, 24, 25, to process signals coming from them.

The devices 23, 24, 25 may be of different types.

For example, the humidity measurement device 23 comprises at least one microwave sensor 27 having an emitter, to emit a signal that is sent on the band W, and a receiver to measure a frequency response of the band W; the control unit 26 processes the response received from the receiver and produces a band humidity value W.

The permeability measurement device 24 comprises for example a water dispenser nozzle 28, a pressure regulator connected to the nozzle so that the nozzle dispenses a flow of water at a pre-set pressure, possibly with the help of a pump and/or compressed air, and a flow meter attached to the nozzle to measure the amount of water passing through the nozzle at the pre-set pressure over the unit of time. Optionally, the permeability measurement device 24 also includes a pressure sensor attached to the nozzle to measure the pressure of the flow of water nozzle dispensed from the nozzle; said pressure sensor is connected to the control unit 26 which uses the pressures values detected by the pressure sensor in the permeability calculation, so as to compensate for any deviation from the pre-set pressure value.

The water needed for the functioning of the device 24 is contained, for example, in a tank 29 carried by the apparatus 4 and is fed to the nozzle 28 via a pump 30, also installed on board the apparatus 4.

If necessary, the apparatus 4 may also have a compressed air tank 31 containing compressed air, again placed on board the apparatus 4.

Alternatively, water and possibly compressed air are fed to the device 24 through respective supply ducts 33, 34 (as further described below, with reference also to FIG. 4).

The temperature measurement device 25 comprises a temperature sensor, for example an infra-red sensor.

The measurement devices 23, 24, 25 are preferably placed on the measuring head 21 and in particular on an outer face 35, in use facing the band W and opposite the rear face 16 of the casing 13 of the measuring head 21. In particular, the microwave sensor 27 and the nozzle 28 protrude from the face 35 outside the guide 2.

The control unit 26 is connected to the measurement devices 23, 24, 25 to process signals coming from them.

The control unit 26 can be placed on board the apparatus 4, or in a remote location; in the latter case, the control unit 26 communicates with the measurement devices 23, 24, 25 via cable or, preferably, via a wireless communication system. The control unit 26 may be integrated into a portable electronic device, of the tablet, hand-held computers, smart phone type, etc.

It is understood that the apparatus 4 can measure other parameters indicative of the conditions of the band W and therefore include one or more other measuring devices than those described previously. For example, the apparatus 4 may also comprise a trigger or optical sensor configured to read a marking printed on the band; a camera to take pictures of the band; a voltage meter or other device for measuring the electrical characteristics of the band; etcetera.

Optionally, the apparatus 4 comprises a support structure 36, for example shaped as a frame closed in a loop and protruding from the face 35 of the casing 13 to cooperate in use with a surface portion of the band W, via a contact surface 37 shaped so as to lie, in use, on a surface portion of the band W and keep the apparatus 4 substantially parallel to said surface portion of the band W.

The support structure 36 as well as the measuring devices 23, 24, 25 protrudes from the guide 2 outside the seat 6.

With reference to FIGS. 4 and 5, the apparatus 4 is provided with a connection interface 40, comprising one or more connectors and/or sockets or connectors to connect the apparatus 4 to an external service station 41 via respective ducts and/or cables.

In the example shown in FIGS. 3 and 4, the interface 40 is located on an end face 42 of the apparatus 4, positioned at a longitudinal end 14 of the apparatus 4; and is covered by a cover 43 positioned above the face 42 and removable from the casing 13 or openable to access the interface 40.

The interface 40 comprises a plurality of connectors and/or sockets or connectors.

In particular, the interface 40 comprises at least one fluid inlet connector 44, connected to an internal circuit (not shown) of the apparatus 4 to supply at least one service fluid to the apparatus 4.

For example, the connector 44 is a water inlet connector connected via an internal circuit (not shown) to the tank 29 or directly to the device 24 to supply water to the nozzle 28.

In the example shown, the interface 40 further comprises an air inlet connector 45, connected via another internal circuit (not shown) to the tank 31.

The connectors 44, 45 are optionally associated to respective pressure gauges 46, 47 and can be connected to external supply ducts 33, 34, extending for example from the service station 41 and provided with relative connectors 48, 49 shaped to connect to the connectors 44, 45.

The apparatus 4 may also be equipped with one or more safety valves 51 (FIG. 3) connected to internal circuits of the apparatus 4 in which service fluid (water/air) circulates to allow venting in case of overpressure.

The service station 41 is placed, for example, at an axial end 52 of the guide 2, i.e. of the rod 5, on the rear wall 8 or on a side wall 9.

The interface 40 also has, optionally, one or more cable sockets or connectors 53 used to recharge the battery 20 and/or for data transmission.

In use, the band W runs in the papermaking machine in front of the guide 2 and precisely in front of the slit 10 of the rod 5.

The apparatus 4 has the casing 13 housed in the guide 2 and the measuring head 21 projecting from the guide 2 through the slot 10.

The apparatus 4 is turned on, possibly by a switch or a remote control, and the apparatus 4 is made to move along the guide 2, for example by means of a drive programme implemented by the control unit 26; the movement of the apparatus 4 along the guide 2 may also be assisted by one or more proximity sensors 54 (FIG. 3) installed on the apparatus 4 and connected to the control unit 26.

While the apparatus 4 moves along the guide 2, the apparatus 4 measures the parameters indicative of the condition of the band W by means of one of the measurement devices 23, 24, 25.

After completing monitoring, the apparatus 4 is brought back to the end 52 of the guide 2 where, for example, the service station 41 is located.

After removing or opening the cover 43, the interface 40 is connected to the service station 41 by means of the connectors 44, 45 or the socket/s 53 to fill the tanks 29, 31, recharge the battery 20 etc.

The service station 41 may however also be placed in another position with respect to the guide 2; in this case, the apparatus 4 is removed from the guide 2 and is brought, for example manually or with the aid of a special handling device, to the service station 41 for recharging.

In this case, the apparatus 4 is optionally equipped with one or more straps 55 (shown in FIGS. 2, 3) for transport by an operator. In particular, the apparatus 4 is equipped with a pair of straps 55 laterally spaced from one another and substantially alongside each other, placed for example on the rear face 16 and extending between the opposite longitudinal ends 14 of the apparatus 4. The straps 55 are shaped and arranged so that the apparatus 4 can be placed on the shoulders like a backpack, directly on the shoulders of the operator and with no need for other supports.

Advantageously, the straps 55 are fitted to the apparatus 4 by means of releasable connections (not shown) so as to be detached from the apparatus 4 when it is inserted in the guide 2 and to be fitted to the apparatus 4 when the apparatus 4 is removed from the guide 2 to be carried to the service station 41.

As mentioned earlier, the apparatus 4 can also be supplied with water and, possibly, compressed air, including via the supply ducts 33, 34 which remain attached to the apparatus 4 when the apparatus 4 moves along the guide 2. In such case, the supply ducts 33, 34 are suitably shaped so as to extend along the axis A and follow the movement of the apparatus 4, being for example shaped as a helically wound tube.

It is finally understood that the monitoring system described and illustrated herein may be subject to modifications and variations without departing from the scope of the appended claims.

The invention claimed is:

1. A monitoring system (1) for monitoring the conditions of a band (W) circulating in a papermaking machine, comprising a guide (2) extending substantially along an axis (A); and a monitoring apparatus (4) movable along the guide (2) and comprising at least one measuring device (23, 24, 25) configured to measure at least one parameter indicative of the conditions of the band (W); the monitoring system (1) being characterized in that the apparatus (4) is a self-propelled motorized apparatus, provided with a motor (11) and at least one driving member (12) operated by the motor (11) and which engages at least one corresponding surface (15) of the guide (2) to move the apparatus (4) along the guide (2); and in that the apparatus (4) is provided with one or more tanks (29, 31) for containing one or more respective service fluids to use in the apparatus (4).

2. The monitoring system according to claim 1, wherein the driving member (12) is defined by at least one driving wheel, connected to the motor (11).

3. The monitoring system according to claim 1, wherein the apparatus (4) comprises a casing (13) extending substantially along the axis (A) and supporting wheels (18) cooperating with the guide (2).

4. The monitoring system according to claim 3, wherein the wheels (18) are inclined with respect to the axis (A).

5. The monitoring system according to claim 1, wherein the apparatus (4) is provided with two sets of wheels (18) located at respective opposite ends (17a, 17b) of the apparatus (4) and on opposite sides of the axis (A) and cooperating with respective surfaces (15), opposite and facing each other, of the guide (2).

6. The monitoring system according to claim 1, wherein the motor (11) is an electric motor powered by a battery (20), also installed on board the apparatus (4).

7. The monitoring system according to claim 1, wherein the guide (2) comprises an internally hollow rod (5) extending along the axis (A) and having an internal longitudinal seat (6) housing a casing (13) of the apparatus (4); the rod (5) being provided with a longitudinal slot (10), parallel to the axis (A) and formed through a front wall (7) of the rod (5); the apparatus (4) comprising at least one measuring head (21) projecting from the casing (13) and shaped and dimensioned so as to be positioned through the slot (10) in such a way that the casing (13) and the measuring head (21) are respectively positioned in the seat (6) and outside the seat (6) beyond the front wall (7) provided with the slot (10).

8. The monitoring system according to claim 1, wherein the monitoring apparatus (4) comprises at least one of: a humidity measurement device (23), configured to measure the humidity of the band (W); a permeability measurement device (24), configured to measure the permeability of the band (W); a temperature measurement device (25), configured to measure the temperature of the band (W).

9. The monitoring system according to claim 1, wherein the apparatus (4) is provided with a connection interface (40), comprising one or more releasable connectors (44, 45) and/or sockets (53) or connectors for connecting the monitoring apparatus (4) to respective outer conduits and/or cables.

10. The monitoring system according to claim 9, wherein the interface (40) is located on an end face (42) of the apparatus (4), positioned at a longitudinal end (14) of the apparatus (4); and is covered by a cover (43) positioned above the face (42) and removable or openable to access the interface (40).

11. The monitoring system according to claim 9, wherein the interface (40) comprises at least a fluid inlet connector (44), connected to the apparatus (4) to feed at least one service fluid to the monitoring apparatus (4).

12. A monitoring system according to claim 11, wherein the fluid inlet connector (44) is connected to a tank (29) installed on board the apparatus (4) and containing an amount of service fluid which is delivered during operation of the apparatus (4).

13. The monitoring system according to claim 9, wherein the interface (40) has one or more sockets (53) or connectors for cables, which are used for charging a battery (20) installed on board the apparatus (4) to supply the motor (11) and/or for data transmission.

14. The monitoring system according to claim 9, and comprising a service station (41) connectable to the interface (40) via conduits and/or cables.

15. The monitoring system according to claim 14, wherein the service station (41) is positioned at an axial end (52) of the guide (2); or is positioned in a remote position with respect to the guide (2) and the apparatus (4) is removable from the guide (2) to be brought to the service station (41).

16. The monitoring system according to claim 1, wherein the apparatus (4) comprises a water dispenser nozzle (28) and carries a tank (29) containing water which is fed to the nozzle (28) by a pump (30), also installed on board the apparatus (4).

17. The monitoring system according to claim 1, wherein the apparatus (4) is provided with a pair of straps (55) arranged substantially side-by-side and laterally spaced apart from each other, and shaped and arranged so that the apparatus (4) can be put on the shoulders in the manner of a backpack, directly on the shoulders of an operator and without requiring additional supports.

18. The monitoring system according to claim 17, wherein the straps (55) are fitted to the apparatus (4) via releasable connections so as to be detached from the apparatus (4) when the apparatus (4) is inside the guide (2) and be fitted to the apparatus (4) when the apparatus (4) is removed from the guide (2) to be carried by an operator.

19. The monitoring system according to claim 1, wherein the guide (2) includes a rod (5) being provided with a longitudinal slot (10), parallel to the axis (A) and formed through a front wall (7) of the rod (5) such that the longitudinal slot (10) directly faces the band (W); the apparatus (4) comprising at least one measuring head (21) that passes through the slot (10) and is located between a top edge and a bottom edge of the front wall (7) of the guide (2).

20. The monitoring system according to claim 1, wherein the apparatus (4) is positioned relative to the guide (2) such that a center axis that is normal to a center of a front face of at least one measuring head (21) of the apparatus (4) passes through the guide (2).

* * * * *